(12) United States Patent
Chelian et al.

(10) Patent No.: US 10,984,314 B1
(45) Date of Patent: Apr. 20, 2021

(54) METHOD AND APPARATUS FOR DECISION MAKING IN A NEURAL MODEL INCLUDING SEMANTIC, EPISODIC, AND PROCEDURAL MEMORY COMPONENTS

(71) Applicant: HRL Laboratories, LLC, Malibu, CA (US)

(72) Inventors: Suhas E. Chelian, Encino, CA (US); Giorgio A. Ascoli, Fairfax Station, VA (US); James Benvenuto, Beverly Hills, CA (US); Michael D. Howard, Westlake Village, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1134 days.

(21) Appl. No.: 14/750,402

(22) Filed: Jun. 25, 2015

Related U.S. Application Data

(63) Continuation-in-part of application No. 14/334,649, filed on Jul. 17, 2014, now Pat. No. 9,552,544, which is a continuation-in-part of application No. 14/300,215, filed on Jun. 9, 2014, now abandoned.

(60) Provisional application No. 62/016,821, filed on Jun. 25, 2014, provisional application No. 61/885,641, filed on Oct. 2, 2013, provisional application No. 61/833,824, filed on Jun. 11, 2013.

(51) Int. Cl.
| | |
|---|---|
| *G06F 15/18* | (2006.01) |
| *G06N 3/08* | (2006.01) |
| *G06N 3/04* | (2006.01) |

(52) U.S. Cl.
CPC ............. *G06N 3/08* (2013.01); *G06N 3/04* (2013.01)

(58) Field of Classification Search
CPC ....................................................... G06N 7/005
USPC ................................................... 706/15, 45
See application file for complete search history.

(56) References Cited

PUBLICATIONS

Anderson, J. R., Bothell, D., Byrne, M. D., Douglass, S., Lebiere, C., & Qin, Y . (2004). An integrated theory of the mind. Psychological Review 111, (4). 1036-1060.

Berke, J. D., Breck J. T., and H. Eichenbaum. "Striatal versus hippocampal representations during win-stay maze performance." Journal of Neurophysiology 101 (2009): 1575-1587.

Bunge, SA, I Kahn, JD Wallis, EK Miller, and AD Wagner. "Neural circuits subserving the retrieval and maintenance of abstract rules." Journal of Neurophysiology 90 (2003): 3419-3428.

(Continued)

*Primary Examiner* — David R Vincent
(74) *Attorney, Agent, or Firm* — Tope-McKay & Associates

(57) ABSTRACT

Described is a system for selecting among intelligence elements of a neural model. An intelligence element is selected from a set of intelligence elements which change group attack probability estimates and processed via multiple operations. A semantic memory component learns group probability distributions and rules based on the group probability distributions. The rules determine which intelligence element related to the groups to select. Given an environment of new probability distributions, the semantic memory component recalls which rule to select to receive a particular intelligence element. An episodic memory component recalls a utility value for each information element A procedural memory component recalls and selects the information element considered to have the highest utility. A list of intelligence elements is published to disambiguate likely attackers.

18 Claims, 10 Drawing Sheets

(56) References Cited

PUBLICATIONS

Chang, Q., and P. E. Gold. "Switching memory systems during learning: Changes in patterns of brain acetylcholine release in the hippocampus and striatum in rats." The Journal of Neuroscience 23 (2003): 3001-3005.

Chelian, Suhas E., Nicholas Oros, Andrew Zaldivar, Jeffrey L. Krichmar, and Rajan Bhattacharyya. "Model of the interactions between neuromodulation and prefrontal cortex during a resource allocation task." ICDL-EpiRob 2012: IEEE Conference on Development and Learning and Epigenetic Robotics. 2012.

DeCoteau, W. E., Thorn C. Gibson D. J. Courtemanche R. Mitra P. Kubota Y., and A. M. Graybiel. "Learning-related coordination of striatal and hippocampal theta rhythms during acquisition of a procedural maze task." Proceedings of the National Academy of Sciences of the United States of America 104 (2007): 5644-5649.

Delgado, Mauricio R., and Kathryn C. Dickerson. "Reward-related learning via multiple memory systems." Biological Psychiatry 72 (2012): 134-141.

Devan, B. D., and N. M. White. "Parallel information processing in the dorsal striatum: Relation to hippocampal function." The Journal of Neuroscience 19 (1999): 2789-2798.

Eichenbaum, H. "A Brain System for Procedural Memory." The Cognitive Neuroscience of Memory: An Introduction. Chapter 10 (2002).

Farr, S. A., Uezu K. Flood J. F., and J. E. Morley. "Septo-hippocampal drug interactions in post-trial memory processing." Brain Research 847 (1999): 221-230.

Gengler, S., Mallot H. A., and C. Hölscher. "Inactivation of the rat dorsal striatum impairs performance in spatial tasks and alters hippocampal theta in the freely moving rat." Behavioral Brain Research 164 (2005): 73-82.

Gibson, B. M., and S. J. Shettleworth. "Place versus response learning revisited: Tests of blocking on the radial maze." Behavioral Neuroscience 119 (2005): 567-586.

Haber, S., K. Kim, P. Mailly, and R. Calzavara. "Reward-related cortical inputs define a large striatal region in primates that interface with associative cortical connections, proving a substrate for incentive-based learning." Journal of Neuroscience 26 (2006): 8368-8376.

Hallworth, N. E., and B. H. Bland. "Basal ganglia-hippocampal interactions support the role of the hippocampal formation in sensorimotor integration." Experimental Neurology 188 (2004): 430-443.

Huang, T.-T., T. E. Hazy, S. A. Herd, and R. C. O'Reilly. "Assembling old tricks for new tasks: a neural model of instruction learning and control." (2013), Journal of Cognitive Neuroscience vol. 25, No. 6, pp. 843-851.

Hubbard, E.M., M. Piazza, P. Pinel, and S. Dehaene. "Interactions between number and space in parietal cortex." Nature Reviews Neuroscience 6 (2005): 435-448.

Jung, M. W., S. I. Wiener, and B. I. McNaughton. "Comparison of spatial firing characteristics of units in dorsal and ventral hippocampus of the rat." Journal of Neuroscience 14 (1994): 7347-7356.

Krichmar, J.L. "The Neuromodulatory System—A Framework for Survival and Adaptive Behavior in a Challenging World." Adaptive Behavior 16 (2008): 385-399.

Lebedev, M., and S. Wise. "Insights into seeing and grasping, distinguishing the neural correlates of perception and action." Behav. Cogn. Neurosci 1 (2002): 108-129.

Lee, A. S., Duman R. S., and C. Pittenger. "A double dissociation revealing bidirectional competition between striatum and hippocampus during learning." Proceedings of the National Academy of Sciences 105 (2008): 17163-17168.

Matthijs, A., A. van der Meer, and A. David Redish. "Expectancies in decision making, reinforcement learning, and ventral striatum." Frontiers in Neuroscience 4 (2010): 29-37.

McClelland, J.L., B.L. McNaughton, and R.C. O'Reilly. "Why there are complementary learning systems in the hippocampus and neocortex: Insights from the successes and failures of connectionist models of learning and memory." Psychological Review 102 (1995): 419-457.

Muller, R. U., and J. L. Kubie. "The effects of changes in the environment on the spatial firing of hippocampal complex-spike cells." Journal of Neuroscience 7 (1987): 1951-1968.

Nadel, L. "Multiple Memory Systems: A New View. Learning and Memory: A Comprehensive Reference." Oxford: Academic Press 1 (2008): 41-52.

Niculescu-Mizil, A. "Multi-armed bandits with betting—on-line learning with limited feedback, in Conference on Learning Theory." Conference on Learning Theory. 2009.

Norman, K.A., and R.C. O'Reilly. "Modeling Hippocampal and Neocortical Contributions to Recognition Memory: A Complementary Learning Systems Approach." Psychological Review 110 (2003): 611-646.

O'Keefe, J. and J. Dostrovsky. "The hippocampus as a spatial map: Preliminary evidence from unit activity in the freely-moving rat." Brain Research 34 (1971): 171-175.

Packard, M. G, and B. J. Knowlton. "Learning and memory functions of the basal ganglia." Annual Review of Neuroscience 25 (2002): 563-593.

Packard, M. G. "Glutamate infused posttraining into the hippocampus or caudate-putamen differentially strengthens place and response learning." Proceedings of the National Academy of Sciences of the United States of America, 96 (1999), 12881-12886.

Packard, M. G., and J. L. McGaugh. "Inactivation of hippocampus or caudate nucleus with lidocaine differentially affects expression of place and response learning." Neurobiology of Learning and Memory 65 (1996): 65-72.

Peters, Jan, and Christian Buchel. "Episodic Future Thinking Reduces Reward Delay Discounting through an Enhancement of Prefrontal-Mediotemporal Interactions." Neuron 66 (2010): 138-148.

Pouget, Alexandre, Peter Dayan, and Richard Zemel. "Information processing with population codes." Nature Reviews Neuroscience 1 (2000): 125-132.

Ragozzino, M. E. "Dynamic changes in acetylcholine output in the medial striatum during place reversal learning." Learning & Memory 11 (2004). 70-77.

Sakagami, M., X. Pan, and B. Uttl. "Behavioral inhibition and prefrontal cortex in decision-making." Neural Networks 19 (2006): 1255-1265.

Samsonovich, A. V., and G. A. Ascoli. "A simple neural network model of the hippocampus suggesting its pathfinding role in episodic memory retrieval," Learn Mem 12, No. 2 (2005): 193-208.

Schmitzer-Torbert, N. "Place and response learning in human virtual navigation: Behavioral measures and gender differences." Behavioral Neuroscience 121 (2007): 277-290.

Sehacter, Daniel L., C.-Y. Peter Chiu, and Kevin N. Ochsner. "Implicit Memory: A Selective Review." Annu. Rev. Neurosci 6 (1993): 159-182.

Shor, O. L., Fidzinski P., and J. Behr. "Muscarinic acetylcholine receptors and voltage-gated calcium channels contribute to bidirectional synaptic plasticity at CA1-subiculum synapses." Neuroscience Letters 449 (2009): 220-223.

Squire, L.R. "Memory systems of the brain: a brief history and current perspective." Neurobiol Learn Mem. 82 (2004): 171-177.

Taube, J. S., R. U. Muller, and J. B., Jr. Ranck. "Head-direction cells recorded from the postsubiculum in freely moving rats: Effects of environmental manipulations." J Neuroscience 10 (1990): 436-447.

Tolman, E. C. "Cognitive maps in rats and men." Psychological Review 55 (1948): 189-208.

Tolman, E. C. "The determiners of behavior at a choice point." Psychological Review 45 (1938): 1-41.

Tudusciuc, O., and A Nieder. "Contributions of primate prefontal and posterior parietal cortices to length and numerosity representation." J Neurophysiol 6 (2009): 2984-2994.

Van der Meer, M., Z. Kurth-Nelson, and AD Redish. "Information processing in decision-making systems." Neuroscientist 18 (2012): 342-359.

Vanni-Mercier, and et al. "The Hippocampus Codes the Uncertainty of Cue-Outcome Associations: An Intracranial Electrophysiological Study in Humans." J Neuroscience 29 (2009): 5287-5294.

(56) References Cited

PUBLICATIONS

Wimmer, G. Elliott, and Daphna Shohamy. "Preference by Association: How Memory Mechanisms in the Hippocampus Bias Decisions." Science 338 (2012): 270-273.

Yin, H. H. "Contributions of striatal subregions to place and response learning." Learning & Memory 11 (2004): 459-463.

Howard, M.D., Bhattacharyya, R., Chelian, S.E., Phillips, M.E., Pilly, P.K., Sun, Y., Wang, H., & Ziegler, M.D. (2015). The neural basis of decision-making during sensemaking: implications for human-system interaction. In Proceedings of 2015 IEEE Aerospace Conference, Big Sky, USA.

Graf, P., & Schacter, D. L. (1985). Implicit and explicit memory for new associations in normal and amnesic subjects. Journal of Experimental Psychology: Learning, Memory, and Cognition, 11, 501-518.

Andrew M. Nuxoll and John E. Laird. Extending Cognitive Architecture with Episodic Memory In the Proceedings of the 21st National Conference on Artificial Intelligence (AAAI), 2007.

J. Krichmar, "The neuromodulatory system—a framework for survival and adaptive behavior in a challenging world." Adaptive Behavior, vol. 16, No. 6, pp. 385-399, Dec. 2008.

W. Schultz, "Dopamine neurons and the role in reward mechanisms," Curr. Opin. Neurobiol., vol. 7, No. 2, pp. 191-197, Apr. 1997.

K. Berridge, "Motivation concepts in behavioral neuroscience," Physiol. Behav., vol. 81, No. 2, pp. 179-209, Apr. 2004.

M. Millan, "The neurobiology and control of anxious states," Prog. Neurobiol., vol. 70, No. 2, pp. 83-244, Jun. 2003.

M. Crockett, L. Clark, G. Tabibnia, M. Lieberman, and T. Robbins, "Serotonin modulates behavioral reactions to unfairness," Science, vol. 320, No. 5884, p. 1739, Jun. 2008.

A. Chiba, D. Bucci, P. Holland, and M. Gallagher, "Basal forebrain cholinergic lesions disrupt increments but not decrements in conditioned stimulus processing," J Neurosci., vol. 15, No. 11, pp. 7315-7322, Nov. 1995.

M. Baxter, P. Holland, and M. Gallagher, "Disruption of decrements in conditioned stimulus processing by selective removal of hippocampal cholinergic input," J. Neurosci., vol. 17, No. 13, pp. 5230-5236, Jul. 1997.

R. Ross, J. McGaughy, and H. Eichenbaum, "Acetylcholine in the orbitofrontal cortex is necessary for the acquisition of a socially transmitted food preference," Learn. Mem., vol. 12, No. 3, pp. 302-306, May 2005.

P. Rudebeck, M. Walton, A. Smyth, D. Bannerman, and M. Rushworth, "Separate neural pathways process different decision costs," Nature Neurosci., vol. 9, No. 9, pp. 1161-1168, Aug. 2006.

M. Rushworth, T. Behrens, P. Rudebeck, and M. Walton, "Contrasting roles for cingulated and orbitofrontal cortex in decisions and social behavior," Trends in Cog. Sci., vol. 11, No. 4, pp. 168-176, Apr. 2007.

N. Oros, A. Chiba, D. Nitz, M. Avery, and J. Krichmar, "Simulation of the neuromodulatory pathways responsible for incrementing and decrementing attention during reversal learning and set-shifting." In Proceeding of the Society for Neuroscience, Washington, D.C., 2011.

A. Zaldivar, D. Asher, and J Krichmar, "Simulation of how neuromodulation influences cooperative behavior," in Simulation of Adaptive Behavior: From Animals to Animats, Lecture Notes on Artificial Intelligence. Berlin, Germany, Springer-Verlag, 2010, pp. 649-660.

A. Niculescu-Mizil, "Multi-armed bandits with betting—on-line learning with limited feedback," in Conference on Learning Theory, Montreal, 2009.

R. Cools, K. Nakamura, and N. Daw, "Serotonin and dopamine: unifying affective, activational, and decision functions," Neuropsychopharm., vol. 36, No. 1, pp. 98-113, Jan. 2011.

F. Denk et al., "Differential involvement of serotonin and dopamine systems in cost-benefit decisions about delay or effort." Psychopharm. vol. 179, No. 3, pp. 587-596, Dec. 2005.

P. Roussos, S. Giakoumaki, S. Pavlakis, and P. Bitsios, "Planning, decision-making and the COMT rs4818 polymorphism in healthy males," Neuropsychologia, vol. 46, No. 2, pp. 757-763, Oct. 2008.

W. Alexander and J. Brown, "Computational models of performance monitoring and cognitive control," Topics in Cognitive Sci., vol. 2, No. 4, pp. 658-677, Apr. 2010.

M. Botvinick, T. Braver, D. Barth, C. Carter, J. Cohen, "Conflict monitoring and cognitive control," Psychological Rev., vol. 108, No. 3, pp. 624-665, Jul. 2001.

M. Sakagami, X. Pan and B. Uttl, "Behavioral inhibition and prefrontal cortex in decision-making," Neural Networks, vol. 19, No. 8, pp. 1255-1265, Sep. 2006.

M. Lebedev, and S. Wise, "Insights into seeing and grasping: distinguishing the neural correlates of perception and action," Behav. Cogn. Neurosci. Rev., vol. 1, No. 2, pp. 108-129, Jun. 2002.

S. Haber, K. Kim, P. Mailly R. Calzavara, "Reward-related cortical inputs define a large striatal region in primates that interface with associative cortical connections, proving a substrate for incentive-based learning," J. Neurosci., vol. 26. No. 32, pp. 8368-8376, Aug. 2006.

T. Robbins and A. Roberts, "Differential regulation of front-executive function by the monoamines and acetylcholine," Cerebral Cortex, vol. 17, No. supplement 1, pp. i151-i160, Sep. 2007.

J. Aclcaraz and C. Maroto, "A robust genetic algorithm for resource allocation in project scheduling," Annals of Operations Res., vol. 102, No. 1, pp. 83-109, Feb. 2001.

A. Litt, C. Eliasmith, P. Thagard, "Neural affective decision theory: choices, brains, and emotions," Cognitive Systems Res., vol. 9, No. 4, pp. 252-273, Oct. 2008.

G. Loewenstein, S. Rick, and J. Cohen, "Neuroeconomics," Annu. Rev. Psychol., vol. 59, No. 1, pp. 647-672, Jan. 2008.

C. Breitenstein et al., "Tonic dopaminergic stimulation impairs associative learning in healthy subjects," Neuropsychopharm., vol. 31, No. 11, pp. 2552-2564, Jul. 2006.

G. Aston-Jones G and J. Cohen, "An integrative theory of locus coeruleus-norepinephrine function: adaptive gain and optimal performance," Annu. Rev. Neurosci., vol. 28, No. 1, pp. 403-450, Jul. 2008.

A. Dombrovski et al., "Reward/punishment reversal learning in older suicide attempters." Am. J. Psychiatry., vol. 167, No. 6, pp. 699-707, Jun. 2010.

F. Jollant et al., "Impaired decision making in suicide attempters," Am. J. Psychiatry , vol. 162, No. 2, pp. 304-310, Feb. 2005.

A. Bechara, A., Damásio, H. Damásio, S. Anderson, "Insensitivity to future consequences following damage to human prefrontal cortex," Cognition, vol. 50, No. 1-3, pp. 7-15, Apr.-Jun. 1994.

H. Markram and M. Tsodyks, "Redistribution of synaptic efficacy between neocortical pyramidal neurons," Nature, vol. 382, No. 6594, pp. 807-810, Aug. 1996.

Gail A. Carpenter and W. Ross. Art-emap: A neural network architecture for learning and prediction by evidence accumulation. IEEE Transactions an Neural Networks, 6(4) 805-818, Jul. 1995.

Peter Redgrave. Basal ganglia. Scholarpedia, 2(6):1825, 2007.

Epley, N. & Gilovich, T. (2006), "The anchoring-and-adjustment heuristic", Psychological Science, 17(4), 311-318.

Epley, N., Keysar, B., Van Boven, L. & Gilovich, T. (2004), "Perspective taking as egocentric anchoring and adjustment", Journal of Personality and Social Psychology, 87(3), 327-339.

Guilbault, R. L., Bryant, F. B., Brockway J. H. & Posavac, E. J. (2004), "A meta-analysis of research on hindsight bias", Basic and Applied Social Psychology, vol. 26, Issue 2-3, 2004, 26, 103-117.

Howard, M., Bhattacharyya, R., O'Reilly, R., Ascoli, G. & Fellous, J. (2011), Adaptive recall in hippocampus, in K. R. J. Alexei V. Samsonovich, ed., "Biologically Inspired Cognitive Architectures 2011—Proceedings of the Second Annual Meeting of the BICA Society", vol. 233 of Frontiers in Artificial Intelligence and Applications. pp. 151-157.

Krichmar, J. L. (2008), "The neuromodulatory system—a framework for survival and adaptive behavior in a challenging world", Adaptive Behavior 16, 385-399.

(56) References Cited

PUBLICATIONS

Norman, Kenneth A., and Randall C. O'Reilly. "Modeling hippocampal and neocortical contributions to recognition memory: a complementary-learning-systems approach." Psychological review 110.4 (2003): 611.

Pohla, R., Eisenhauera, M. & Hardtb, O. (2003), "SARA: A cognitive process model to simulate the anchoring effect and hindsight bias", Memory 11(4-5), 337-356.

Tversky, A. & Kahneman, D. (1974), "Judgment under uncertainty: Heuristics and biases", Science 185, 1124-1130.

| Memory Type | Semantic (a type of Declarative memory) | Episodic (a type of Declarative memory) | Procedural, Fixed | Procedural, Adaptable |
|---|---|---|---|---|
| Brain Region | Hippocampal or Cortical | Hippocampal | Striatal (DLS) | Striatal (DMS) |
| Training Regime (speed in learning) | Fast for Hippocampal, Slow for Cortical | Fast | Slow | Slow |
| Execution (speed in recall) | Slow | Slow | Fast | Fast |
| Flexibility | Fixed or Adaptable | Adaptable | Fixed | Adaptable |
| Primary Neuromodulator | Acetylcholine | Acetylcholine | Dopamine | Dopamine |

FIG. 1

| Memory Type | Semantic | Episodic | Procedural, Fixed | Procedural, Adaptable |
|---|---|---|---|---|
| Brain Region | Cortical only | Hippocampal | Striatal (DLS) | Striatal (DMS) |
| Training Regime (speed in learning & when applied) | Slow, Before the Task | Fast, After each trail of the task | n/a | Slow, After each trail of the task |
| Execution (speed in recall) | Slow | Slow | n/a | Fast |
| Flexibility | Fixed | Adaptable | n/a | Adaptable |
| Content (what it contains) | Hard corded rules | Affective trace of a choice | n/a | Learned utility of a choice |

FIG. 2

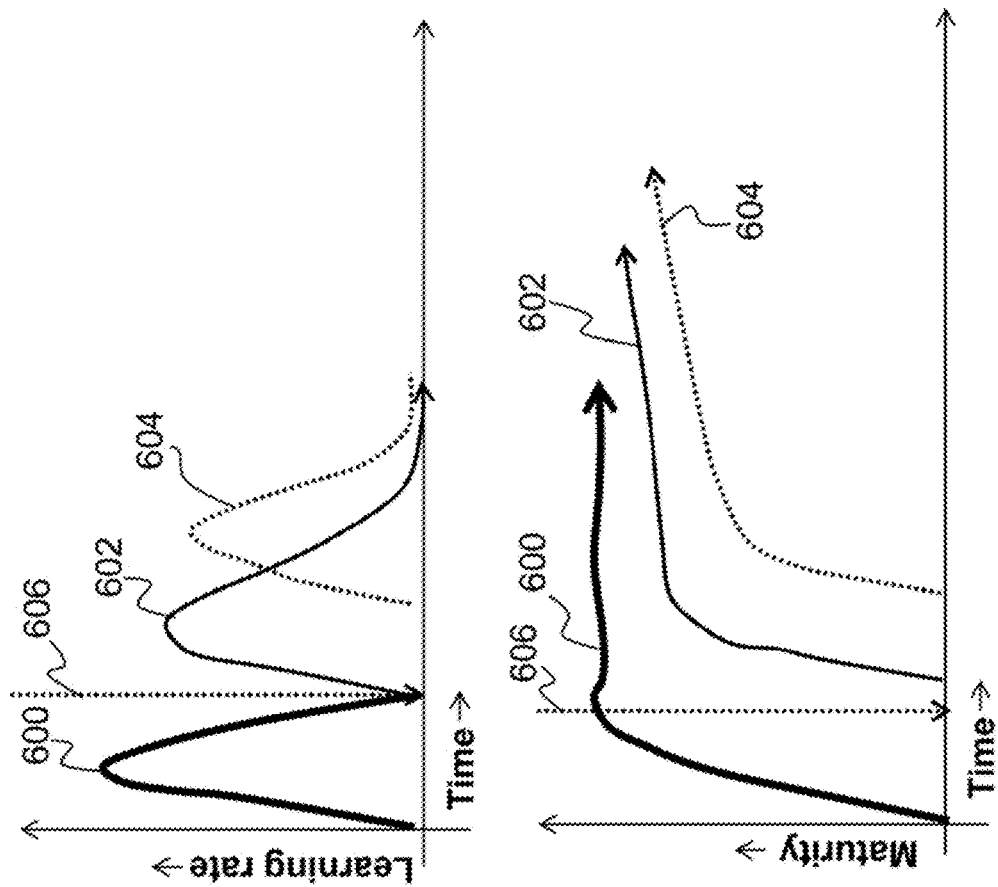

METHOD AND APPARATUS FOR DECISION MAKING IN A NEURAL MODEL INCLUDING SEMANTIC, EPISODIC, AND PROCEDURAL MEMORY COMPONENTS

CROSS-REFERENCE TO RELATED APPLICATIONS

This is a Continuation-in-Part patent application of U.S. application Ser. No. 14/334,649, filed in the United States on Jul. 17, 2014, entitled, "Method and Apparatus for an Action Selection System Based on a Combination of Neuromodulatory and Prefrontal Cortex Area Models," which is a Non-Provisional patent application of U.S. Provisional Application No. 61/885,641, filed in the United States on Oct. 2, 2013, entitled, "Method and Apparatus for an Action Selection System Based on a Combination of Neuromodulatory and Prefrontal Cortex Area Models", all of which are incorporated herein by reference in their entirety.

This is ALSO a Continuation-in-Part patent application of U.S. application Ser. No. 14/300,215, filed in the United States on Jun. 9, 2014, entitled, "Automated Simulation of Human Anchoring Bias," which is a Non-Provisional patent application of U.S. Provisional Application No. 61/833,824, filed in the United States on Jun. 11, 2013, entitled, "Automated Simulation of Human Anchoring Bias", all of which are incorporated herein by reference in their entirety.

This is ALSO a Non-Provisional patent application of U.S. Provisional Application No. 62/016,821, filed in the United States on Jun. 25, 2014, entitled, "Method and Apparatus for Decision Making in a Neural Model Including Semantic, Episodic, and Procedural Memory Components," which is incorporated herein by reference in its entirety.

GOVERNMENT LICENSE RIGHTS

This invention was made with government support under U.S. Government Contract Number D10PC20021 ICArUS-MINDS. The government has certain rights in the invention.

BACKGROUND OF THE INVENTION

(1) Field of Invention

The present invention relates to a system for decision making and, more particularly, to a system for decision making in a neural model including semantic, episodic, and procedural memory components.

(2) Description of Related Art

The interplay between various memory systems for decision making has been partly studied in a variety of cognitive architectures, but a neuronal-level understanding remains fragmentary. Neuronal-level models have greater explanatory power in terms of predicted biases in decision making such as anchoring and risk aversion (see the List of Incorporated Literature References, Reference Nos. 5 and 50).

Adaptive Control of Thought—Rational (ACT-R) (see Literature Reference No. 1) and Soar (see Literature Reference No. 52) are examples of cognitive architectures that use semantic, episodic, and procedural memory components for decision making. However, these models are not bio-inspired and, hence, cannot make predictions of animal behavior based on lesion studies or neurotransmitter imbalances.

Thus, a continuing need exists for integration of semantic, episodic, and procedural memory components to model decision making.

SUMMARY OF THE INVENTION

The present invention relates to a system for decision making and, more particularly, to a system for decision making in a neural model including semantic, episodic, and procedural memory components. The system comprises one or more processors and a memory having instructions such that when the instructions are executed, the one or more processors perform multiple operations. A set of intelligence elements which change group attack probability estimates to disambiguate likely attackers is received. An intelligence element in the set of intelligence elements is selected. For each selected intelligence element, a plurality of operations are performed comprising: (a) training a semantic memory component of the neural model to learn a set of group probability distributions for a plurality of groups and a set of rules related to the plurality of groups based on the set of group probability distributions, wherein the set of rules are utilized to determine which intelligence element in the set of intelligence elements related to the plurality of groups to select; (b) given an environment comprising a new set of probability distributions for a plurality of groups, using the semantic memory component to recall which rule in the set of rules to select to receive a particular intelligence element, wherein the selected rule is an output of the semantic memory component; (c) using an episodic memory component in the neural model to recall a utility value for each information element, wherein the utility values are an output of the episodic memory component; and (d) using a procedural memory component to recall and select the information element considered to have the highest utility, wherein the selected information element is an output of the procedural memory component. Operations (a) through (d) are repeated until each of the intelligence elements has been selected. An ordered list of intelligence elements is published to select to disambiguate likely attackers.

In another aspect, the system encodes which groups in the plurality of groups need to be distinguished based on the set of group probability distributions. The system recalls which intelligence element is best to discriminate between the groups. An intelligence element selection is requested, and a rule corresponding to the requested intelligence element selection is selected to apply to at least one probability distribution in the set of group probability distributions. The set of group probability distributions are then updated.

In another aspect, the plurality of groups are distinguished by different entropy states, and the selected rule is the rule in the set of rules that will most likely represent a lower entropy state.

In another aspect, utility is proportional to negentropy and inversely proportional to entropy.

In another aspect, the set of group probability distributions represent probabilities over different diseases, the set of rules represent different diagnostic tests, and the set of group probability distributions are updated based on outcomes of the different diagnostic tests, wherein the goal is to adjust the set of group probability distributions to a low entropy state to make a decision regarding a particular disease.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1 is a table comparing different memory types along dimensions of brain embodiment, learning rates, retrieval speed, and flexibility;

FIG. 2 is a table comparing properties of different memory types as used in the neural model according to the principles of the present invention;

FIG. 6A illustrates learning rates of modeled semantic, episodic, and procedural memory systems as a function of time according to the principles of the present invention;

FIG. 6B illustrates maturity of modeled semantic, episodic, and procedural memory systems as a function of time according to the principles of the present invention;

DETAILED DESCRIPTION

Figure 3:
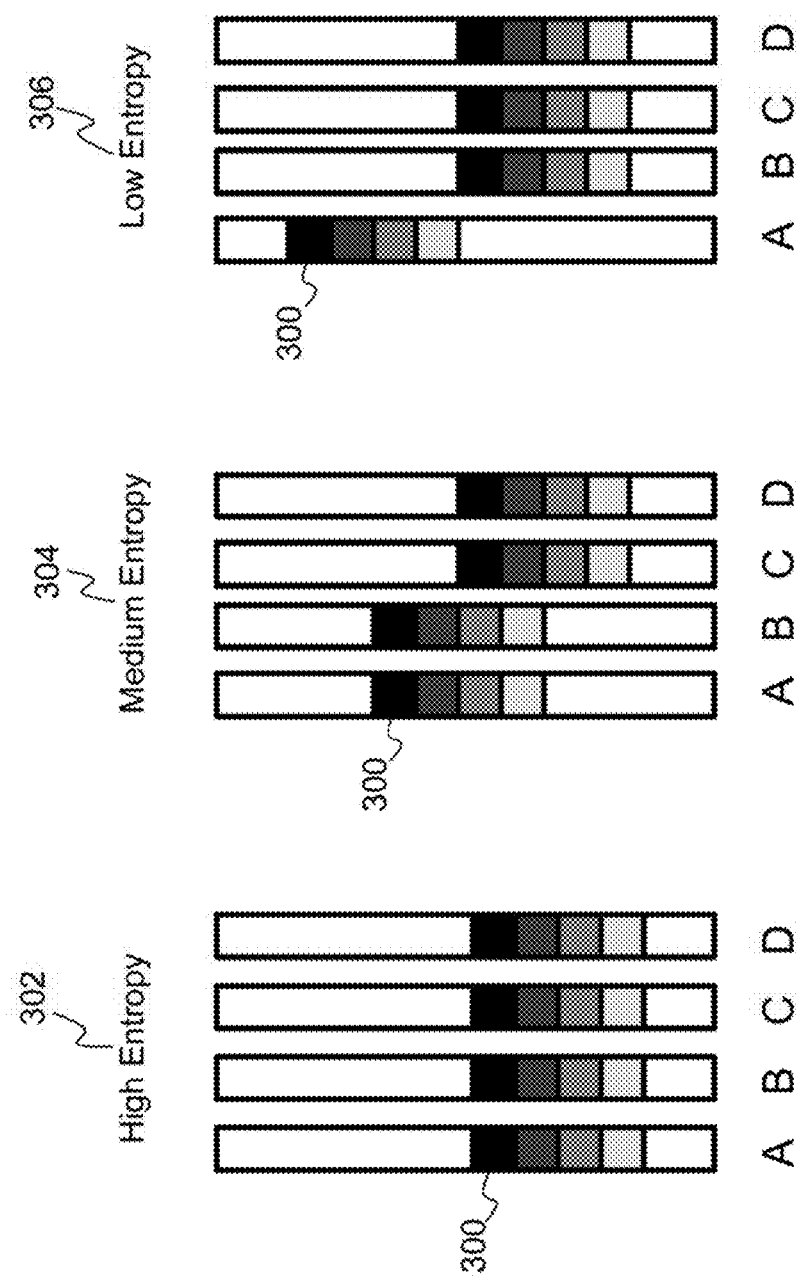
FIG. 3 illustrates representatives of different entropy classes according to the present invention.

The present invention relates to a system for decision making and, more particularly, to a system for decision making in a neural model including semantic, episodic, and procedural memory components. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Anderson, J. R., Bothell, D., Byrne, M. D., Douglass, S., Lebiere, C., & Qin, Y. (2004). An integrated theory of the mind. *Psychological Review* 111, (4). 1036-1060.
2. Berke, J. D., Breck J. T., and H. Eichenbaum. "Striatal versus hippocampal representations during win-stay maze performance." Journal of Neurophysiology 101 (2009): 1575-1587.
3. Bunge, S A, I Kahn, J D Wallis, E K Miller, and A D Wagner. "Neural circuits subserving the retrieval and maintenance of abstract rules," Journal of Neurophysiology 90 (200); 3419-3428.
4. Chang, Q., and P. E. Gold. "Switching memory systems during learning: Changes in patterns of brain acetylcholine release in the hippocampus and striatum in rats." The Journal of Neuroscience 23 (2003): 3001-3005.
5. Chelian, Suhas E., Nicholas Oros, Andrew Zaldivar, Jeffrey L. Krichmar, and Rajan Bhattacharyya. "Model of the interactions between neuromodulation and prefrontal cortex during a resource allocation task." ICDL-EpiRob 2012: IEEE Conference on Development and Learning and Epigenetic Robotics. 2012.
6. DeCoteau, W. E., Thorn C. Gibson D. J. Courtemanche Mitra P. Kubota Y., and A. M. Graybiel. "Learning-related coordination of striatal and hippocampal theta rhythms during acquisition of a procedural maze task." Proceedings of the National Academy of Sciences of the United States of America 104 (2007); 5644-5649.
7. Delgado, Mauricio R., and Kathryn C. Dickerson. "Reward-related learning via multiple memory systems." Biological Psychiatry 72 (2012): 134-141.
8. Devan, B. D., and N. M. White, "Parallel information processing in the dorsal striatum: Relation to hippocampal function." The Journal of Neuroscience 19 (1999): 2789-2798.
9. Eichenbaum, H, and N J Cohen. Memory, Amnesia, and the Hippocampal System. MIT Press, 1993.
10. Eichenbaum, H. "A Brain System for Procedural Memory." The Cognitive Neuroscience of Memory: An Introduction. Chapter 10 (2002).
11. Farr, S. A., Uezu K. Flood J. F., and J. E. Morley. "Septo-hippocampal drug interactions in post-trial memory processing." Brain Research 847 (1999): 221-230.
12. Gengler, S., Mallot H. A., and C. Hölscher. "Inactivation of the rat dorsal striatum impairs performance in spatial tasks and alters hippocampal theta in the freely moving rat." Behavioral Brain Research 164 (2005): 73-82.
13. Gibson, B. M., and S. J. Shettleworth. "Place versus response learning revisited: Tests of blocking on the radial maze." Behavioral Neuroscience 119 (2005): 567-586.
14. Haber, S., K. Kim, P. Mailly, and R. Calzavara. "Reward-related cortical inputs define a large striatal region in primates that interface with associative cortical connections, proving a substrate for incentive-based learning." Journal of Neuroscience 26 (2006): 8368-8376.
15. Hallworth, N. E., and B. H. Bland. "Basal ganglia-hippocampal interactions support the role of the hippocampal formation in sensorimotor integration," Experimental Neurology 188 (2004): 430-443.
16. Huang, T. R., T. E. Hazy, S. A. Herd, and R. C. O'Reilly. "Assembling old tricks for new tasks: a neural model of instruction learning and control," Journal of Cognitive Neuroscience, in press.
17. Hubbard, E. M., M. Piazza, P. Pinel, and S. Dehaene. "Interactions between number and space in parietal cortex," Nature Reviews Neuroscience 6 (2005): 435-448.
18. Jung, M. W., S. I. Wiener, and B. L. McNaughton. "Comparison of spatial firing characteristics of units in dorsal and ventral hippocampus of the rat." Journal of Neuroscience 14 (1994): 7347-7356.
19. Krichmar, J. L. "The Neuromodulatory System—A Framework for Survival and Adaptive Behavior in a Challenging World." Adaptive Behavior 16 (2008): 385-399.
20. Lebedev, M., and S. Wise. "Insights into seeing and grasping: distinguishing the neural correlates of perception and action." Behav. Cogn. Neurosci 1 (2002): 108-129.
21. Lee A. S., Duman R. S., and C. Pittenger. "A double dissociation revealing bidirectional competition between striatum and hippocampus during learning." Proceedings of the National Academy of Sciences 105 (2008): 17163-17168.
22. Matthijs, A., A. van der Meer, and A. David Redish. "Expectancies in decision making, reinforcement learning, and ventral striatum." Frontiers in Neuroscience 4 (2010): 29-37.
23. McClelland, J. L., B. L. McNaughton, and R. C. O'Reilly, "Why there are complementary learning systems in the hippocampus and neocortex: Insights from the successes and failures of connectionist models of learning and memory." Psychological Review 102 (1995): 419-457.
24. Muller, R. U., and J. L. Kubie. "The effects of changes in the environment on the spatial firing of hippocampal complex-spike cells." Journal of Neuroscience 7 (1987): 1951-1968.
25. Nadel, L. "Multiple Memory Systems: A New View. Learning and Memory: A Comprehensive Reference," Oxford: Academic Press 1 (2008): 41-52.
26. Niculescu-Mizil, A. "Multi-armed bandits with betting-on-line learning with limited feedback," in Conference on Learning Theory." Conference on Learning Theory. 2009.
27. Norman, K. A., and R. C. O'Reilly. "Modeling Hippocampal and Neocortical Contributions to Recognition Memory: A Complementary Learning Systems Approach." Psychological Review 110 (2003): 611-646.
28. O'Keefe, J., and J. Dostrovsky. "The hippocampus as a spatial map: Preliminary evidence from unit activity in the freely-moving rat." Brain Research 34 (1971): 171-175.
29. Packard, M. G, and B. J. Knowlton. "Learning and memory functions of the basal ganglia." Annual Review of Neuroscience 25 (2002): 563-593.
30. Packard, M. G. "Glutamate infused posttraining into the hippocampus or caudate-putamen differentially strengthens place and response learning." Proceedings of the National Academy of Sciences of the United States of America, 96 (1999).
31. Packard, M. G., and J. L. McGaugh. "Inactivation of hippocampus or caudate nucleus with lidocaine differentially affects expression of place and response learning." Neurobiology of Learning and Memory 65 (1996): 65-72.
32. Peters, Jan, and Christian Buchel. "Episodic Future Thinking Reduces Reward Delay Discounting through an Enhancement of Prefrontal-Mediotemporal Interactions." Neuron 66 (2010): 138-148.
33. Pouget, Alexandre, Peter Dayan, and Richard Zemel. "Information processing with population codes." Nature Reviews Neuroscience 1 (2000): 125-132.
34. Ragozzino, M. E. "Dynamic changes in acetylcholine output in the medial striatum during place reversal learning." Learning & Memory 11 (2004): 70-77.
35. Sakagami, M., X. Pan, and B. Uttl. "Behavioral inhibition and prefrontal cortex in decision-making." Neural Networks 19 (2006): 1255-1265.
36. Samsonovich, A. V., and G. A. Ascoli. "A simple neural network model of the hippocampus suggesting its path-finding role in episodic memory retrieval." Learn Mem 12, no. 2 (2005): 193-208.
37. Schmilzer-Torbert, N. "Place and response learning in human virtual navigation: Behavioral measures and gender differences." Behavioral Neuroscience 121 (2007): 277-290.
38. Sehacter, Daniel L., C. Y. Peter Chiu, and Kevin N. Ochsner. "IMPLICIT MEMORY: A Selective Review." Annu. Rev. Neurosci 6 (1993): 159-182.
39. Shor, O. L., Fidzinski P., and J. Behr. "Muscarinic acetylcholine receptors and voltage-gated calcium channels contribute to bidirectional synaptic plasticity at CAl-subiculum synapses." Neuroscience Letters 449 (2009): 220-223.
40. Squire, L. R. "Memory systems of the brain: a brief history and current perspective." Neurobiol Learn Mem. 82 (2004): 171-177.
41. Squire, L R, and Schacter D L. The Neuropsychology of Memory. Guilford Press, 2002.
42. Taube, J. S., R. U. Muller, and J. B., Jr. Ranck. "Head-direction cells recorded from the postsubiculum in freely moving rats: Effects of environmental manipulations." J Neuroscience 10 (1990): 436-447.
43. Tolman, E. C. "Cognitive maps in rats and men." Psychological Review 55 (1948): 189-208.
44. Tolman, E. C. "The determiners of behavior at a choice point." Psychological Review 45 (1938): 1-41.
45. Tudusciue, O., and A. Nieder, "Contributions of primate prefontal and posterior parietal cortices to length and numerosity representation," J Neurophysiol 6 (2009): 2984-2994.
46. van der Meer, M., Z. Kurth-Nelson, and A D Redish. "Information processing in decision-making systems," Neuroscientist 18 (2012): 342-359.
47. Vanni-Mercier, and et al. "The Hippocampus Codes the Uncertainty of Cue-Outcome Associations: An Intracranial Electrophysiological Study in Humans." J Neuroscience 29 (2009): 5287-5294.
48. Wimmer, G. Elliott, and Daphna Shohamy. "Preference by Association: How Memory Mechanisms in the Hippocampus Bias Decisions." Science 338 (2012): 270-273.
49. Yin, H. H. "Contributions of striatal subregions to place and response learning." Learning & Memory 11 (2004): 459-463.
50. Ziegler, M., Howard, M., Zaldivar, A., Chelian, S., O'Reilly, R., Krichmar, J., Bhattacharyya, R. (2012). Automated simulation of human anchoring bias.
51. Graf, P., & Schacter, D. L. (1985). Implicit and explicit memory for new associations in normal and amnesic subjects. Journal of Experimental Psychology: Learning, Memory, and Cognition, 11, 501-518.
52. Andrew M. Nuxoll and John E. Laird. Extending Cognitive Architecture with Episodic Memory. In the Proceedings of the 21st National Conference on Artificial Intelligence (AAAI), 2007.

(2) Principal Aspects

The present invention has three "principal" aspects. The first is a system for decision making in a neural model. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for decision making in a neural model. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

Decision making is supported by several categories of memory (e.g., spatial, temporal) and sense making processes (e.g., mental simulation, logical inference). The present invention focuses on long-term individual memory systems, as opposed to short-term or sociocultural memory stores. Memory is often divided into declarative/explicit and procedural/implicit systems (see Literature Reference No. 52). Declarative memory includes semantic and episodic memory; procedural memory is the memory of skills. Declarative and procedural memories are also supported by different brain regions as supported by numerous observations (see Literature Reference No. 31) and theory (see Literature Reference No. 25). Differences between these memory systems are summarized in the table in FIG. 1, which displays a comparison of different memory types along dimensions of brain embodiment, learning rates, retrieval speed, and flexibility. The present invention integrates three separate models of semantic, episodic, and procedural (adaptable) memory into a single decision making system. The table in FIG. 2 lists several differences between each type of memory.

(4) Specific Details (4.1) Intelligence (INT) Selection Task

In this non-limiting example, the task is to predict an attacker based on a geospatial intelligence (geo-int) display. Each intelligence (INT) element, such as imaginary intelligence (IMINT), signals intelligence (SIGINT), and social media intelligence (SOCINT), changes group attack probability estimates to disambiguate likely attackers. The goal of the task is to understand probability distributions and how to select a rule from a set of known rules that will maximize information gain. Non-limiting examples of some of the rules include:

IMINT: If group A or B attack, then the attack is four times as likely to occur on a major road versus a minor road. If group C or D, then vice versa.

SIGINT: If a group attacks, then that group is seven times as likely to generate chatter versus silence.

SOCINT: If a group attacks, then that group is twice as likely to attack in its own region vs. another region.

The model according to the principles of the present invention employs coarse-coded distributed representations, ubiquitous in the cortex, for internal representations of spatial magnitude and number sense (e.g., a specific value on a mental number line), through learning in conjunction with the parietal cortex (see Literature Reference Nos. 17, 33, and 45).

FIG. 3 illustrates representatives of different entropy classes for four different groups: A, B, C, and D. The groups A, B, C, and D represent probabilities as number lines from 0 to 100%, where a slider 300 represents a value on that number line. The entropy of the set of four probabilities (i.e., high entropy 302, medium entropy 304, low entropy 306) is lowest when one of the probabilities is clearly differentiated from the rest, as depicted in the low entropy 306 class.

Entropy is highest when all probabilities are equal, as depicted in the high entropy 302 class.

Course-coded distributed representations are visualized as a vertical column of neural units (depicted as a column of squares), with a Gaussian bump of active units representing a rough value. In FIG. 3, the lighter the color of the square, the higher the activity of the neural units, thus representing more elevated portions of the Gaussian bump relative to other neural units. In this case, the rough values represent probabilities in the prefrontal cortex (PFC) for the different groups, A, B, C, and D. Several different entropy classes (i.e., high entropy 302, medium entropy 304, low entropy 306) of the probabilities that each group conducted the most recent attack are shown.

The system must select one rule (such as IMINT, SOCINT, etc.) at a time that will most likely make the probability distribution more peaked (i.e., lower entropy 306). A more peaked probability distribution represents a state of greater certitude in identifying an attacking group. As an example, the low entropy class 306 represents a greater certitude that group A is the attacker over the other groups. Similarly, as an example, the medium entropy class 304 represents a greater certitude that either group A or group B is the attacker over the other groups. This implies some semantic understanding about probability distributions and the possible results, as determined by rule application, of selecting and receiving particular intelligence.

(4.2) Semantic Memory

The present invention focuses on hippocampal semantic memory learned prior to task performance without updates, Its execution speed in recall is slow because the hippocampal memory system requires temporal cortex to "parse" the context of group probabilities. It is used to recall hard coded rules or semantics of which INT to pick in a given situation.

Figure 4:
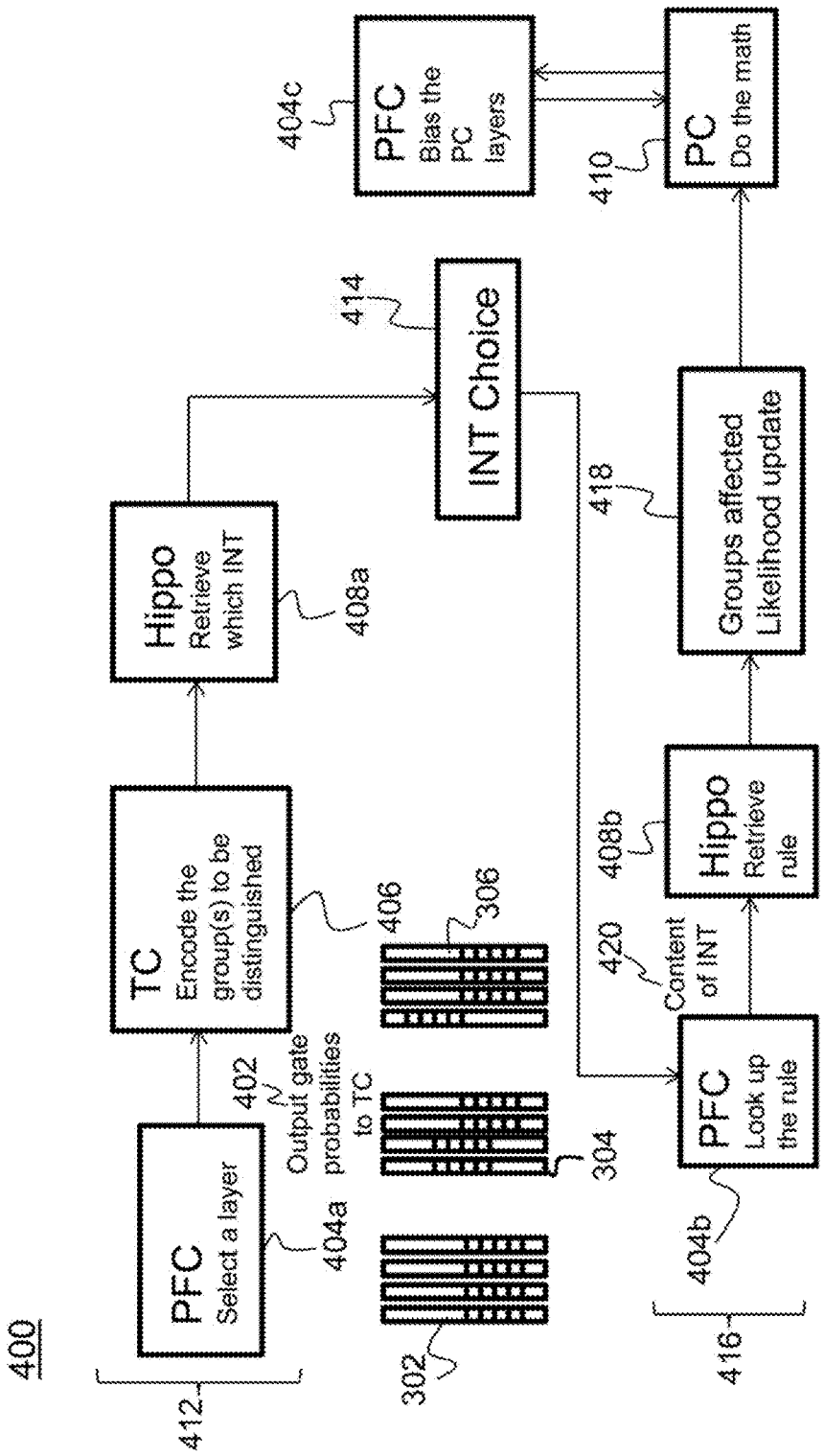
FIG. 4 illustrates rule retrieval interaction between the prefrontal cortex (PFC), the temporal cortex (TC), and the hippocampus according to the principles of the present invention.

The temporal cortex (TC) is known to be involved in semantic processing. The most prominent example is in language processing. It is suggested in (Literature Reference No. 3) that the posterior middle TC represents semantic information about cues associated with specific actions, arid the left middle TC may store the long-term knowledge that constitutes each abstract rule representation. As depicted in FIG. 4, in the example domain of the semantic memory module 400, the current probabilities 402 of four groups (A, B, C, and D from FIG. 3) are projected from the PFC 404a to the TC 406 to select which of several rules to apply in order to determine which INT to request by the hippocampus 408a to reduce the entropy. Reducing entropy is the explicit goal of the task (i.e., determine the most probable attacker).

FIG. 4 illustrates rule retrieval interactions between the PFC 404a and 404b, the TC 406, and the hippocampus 408a and 408b. Based on a current state of the probabilities 402, the TC 406 returns a rule to be applied to help reduce the entropy of the distribution. The TC 406 is pre-trained to learn which rule to prescribe given the distribution class, and does not learn from experience. The pre-training consists of eleven categories of probabilities and the corresponding rule to apply for each. Probability distributions supplied include one of high entropy, six of medium entropy, and four of low entropy.

FIG. 4 illustrates one instance from each category. in the high entropy case (element 302) a rule is needed to differentiate one of the four groups (A, B, C, D), since none of them stands out, as indicated by the identical active unit patterns. In the medium entropy case (element 304), a rule is needed to differentiate between one of the two leading groups, indicated by elevated active units. In the low entropy case, a rule is needed to confirm (or disconfirm) the current leading group, indicated by the elevated active units.

A two-stage rule retrieval procedure is implemented in the hippocampus 408a and 408b, interacting with the PFC 404a and 404b, the TC 406, and the parietal cortex (PC) 410, as illustrated in FIG. 4. The TC 406 encodes which groups need to be distinguished, based on the probabilities read from the PFC 404a. The PFC 404a selects a type of INT (also called a "layer" or "element" of the available intelligence). Based on that, the hippocampus 408a recalls, in a first stage recall 412, what INT layer is best to discriminate between groups. An INT choice 414 is requested, and the value of that INT choice 414 becomes the cue for a second stage recall 416 from the hippocampus 408b after the PFC 404b looks up the rule. The INT choice 414 is read programmatically from the hippocampus 408b, and a value for that INT is randomly chosen. This time the information needed is somewhat procedural: the likelihood update that should be applied to the probabilities, and what groups are affected 418. For example, if a SOCINT is requested, and its value is group A, then the probability for A would be multiplied by 2 per the example of SOCINT listed above ("if a group attacks, then that group is twice as likely, etc."). The PC 410 computational units selected by the PFC 404c bias apply the likelihood, and update the probability maintained in the PFC 404a.

The PFC 404c bias is a control switch on the PC 410, which selects and configures the computational units appropriate to process the other inputs. The inputs are the probabilities of each hypothesis and the rule for updating the probability of each group. In the example shown in FIG. 4, hypotheses are made about which group is responsible for some event. In this example, SOCINT indicates in which group's territory an event happened; in this case, the system indicated A. The rule is, if an event happens, it is twice as likely that the group whose territory it happened in is the perpetrator. Therefore, the probability A is multiplied by 2. The phrase "Do the math" in FIG. 4 means that the computational units will do the required computations. The output of the PC 410 goes back to update the probabilities held in the working memory of the PFC 404c bias. The operations are repeated until each of the intelligence elements (or layers) has been selected.

All hippocampal inputs and outputs are localist representations for both stages. In summary, the two-stage recall is as follows:

Stage 1, element 412: What INT should be requested next?
  Input: INTs already received and Groups that need to be distinguished (elements 302, 304, and 306)
  Output: INT to request from the hippocampus 408a Stage 2, element 414: What rule applies? (in the PFC 404b)
  Input: content of current INT (element 420)
  Output: Groups to modify and likelihood update factor (element 418)

Figure 5B:
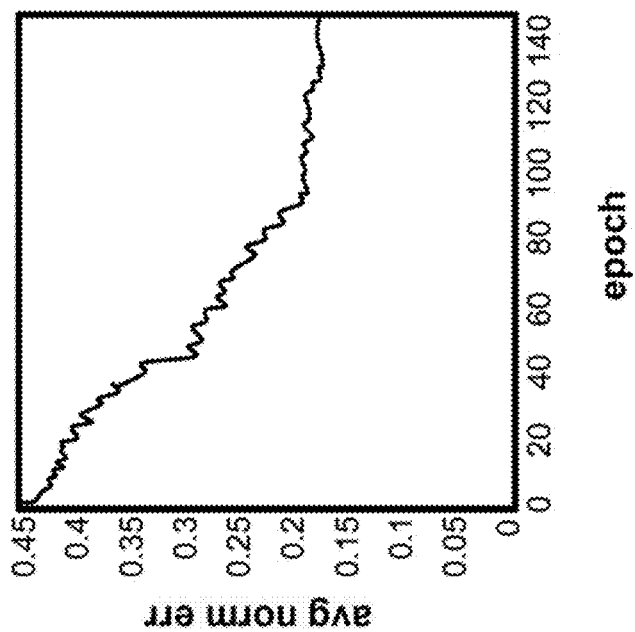
FIG. 5B illustrates an average norm of error training curve for the temporal cortex according to the principles of the present invention.
Figure 5A:
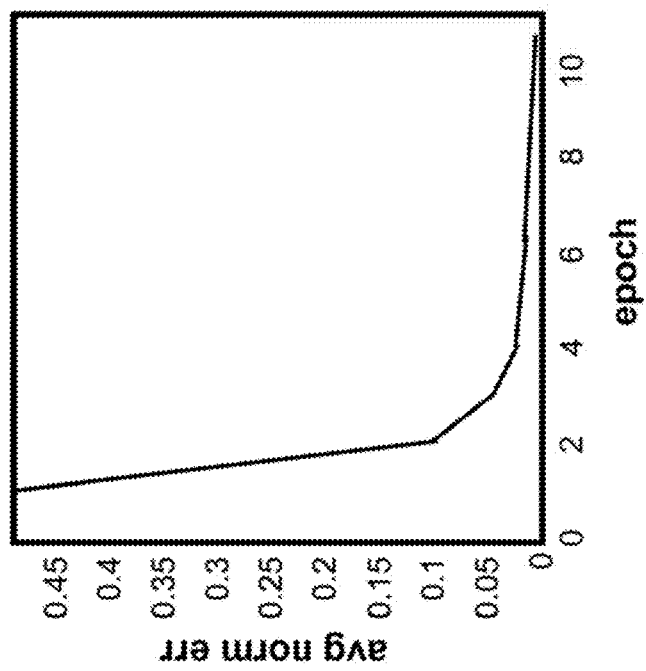
FIG. 5A illustrates an average norm of error training curve for the hippocampus according to the principles of the present invention.

FIGS. 5A and 5B illustrate differences in learning rates between the temporal cortex (FIG. 5B) and the hippocampus (FIG. 5A). Each epoch represents one pass of the training data set. FIG. 5A shows the error during training of the hippocampus. The hippocampus trains to zero error (average norm of error) in only 10 presentations of its training set. The graph show how fast and precise the hippocampus is at learning. FIG. 5B shows the error during training of the temporal cortex. The average norm error asymptotes to about 0.17 after 150 presentations of its training set. Although its execution speed is fast, it is much slower than the hippocampus to train. These graphs show the difference in the nature of the types of memory each learns. The hippocampus learns discrete memories which can be accurately recalled, whereas the temporal cortex learns slowly across time and merges similar memories such that similar sets of the experience get approximately recalled.

Figure 9:
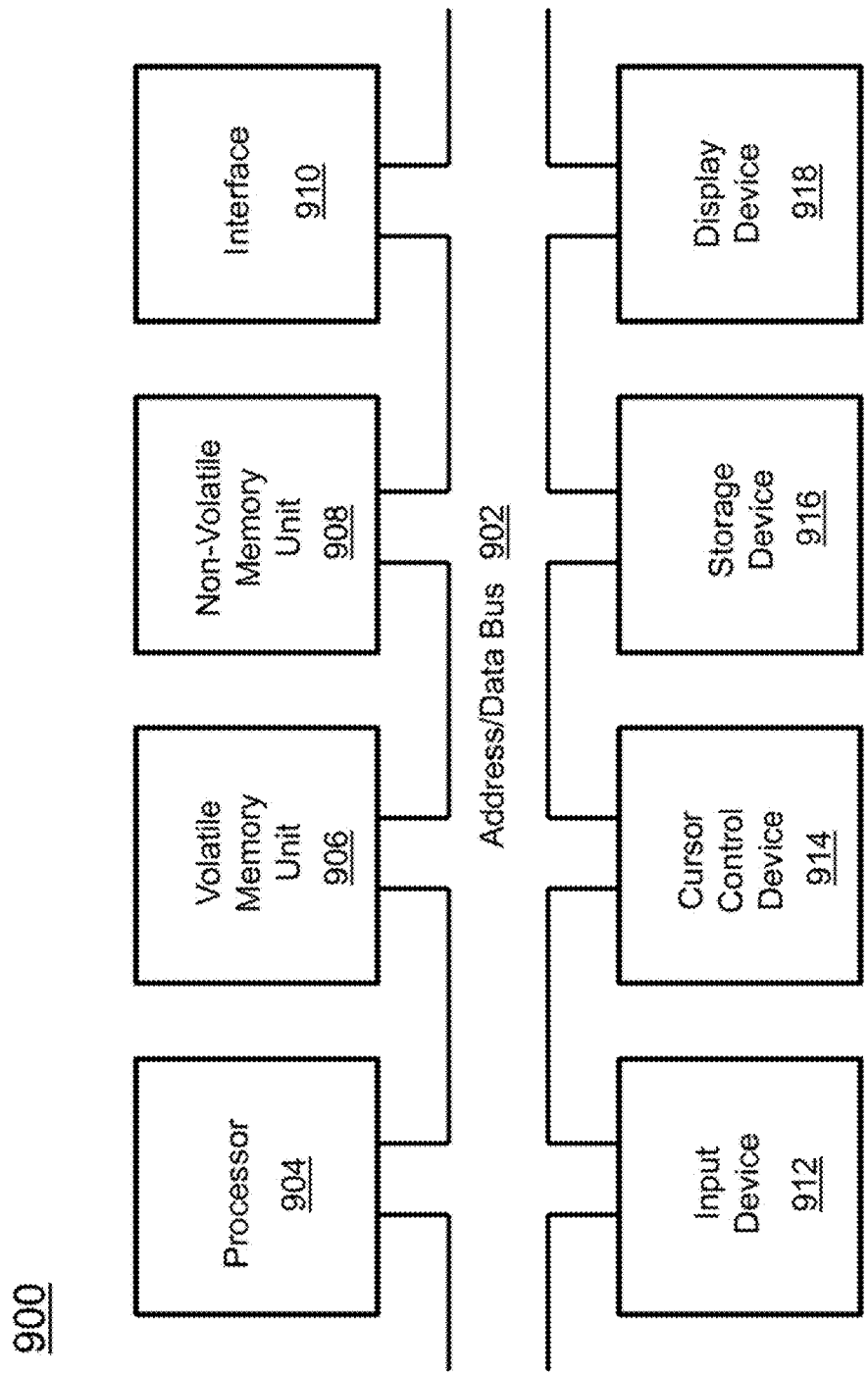
FIG. 9 is an illustration of a data processing system according to the principles of the present invention.

In testing against the average performance of 103 human subjects, the model according to the principles of the present invention achieved a 74.5% relative match rate, which measures how well the model matched the human modal response, with the INT selections of the humans. For each trial, the INT to be selected from pre-trained rules was selected. Thus, for seven INTs, one INT was chosen. As depicted in FIG. 9, this INT is then projected from the semantic memory module 400 to the dorsolateral prefrontal cortex (DLPFC) 900, an area of the PFC known to be involved in executive control of actions (see Literature Reference No. 35).

(4.3) Episodic Memory

The method according to the principles of the present invention focuses on hippocampal episodic memory learned after each trail of the task. Its execution speed in recall is quick because the hippocampal memory system simply recalls the affective trace of an INT choice. The science linking the hippocampus with reward is circumstantial, but compelling. It has been established that the hippocampus links context with reward.

As described in Literature Reference No. 50, a model of anchoring in a spatial estimation task was developed using a hippocampal model including such regions as the entorhinal cortex, the dentate gyrus, CA3, and CA1, inputs from temporal and parietal cortex, and attentional modulation from the basal forebrain. Here, anchoring refers to weighing older evidence more than newer attack points. The task was to predict where a particular group would attack next based on its current set of attacks and a history of past attacks.

To simulate the recall of past attacks, the entorhinal cortex was supplied with a group identifier and the location of previous attacks from that group through temporal and parietal cortices, respectively. The hippocampus recalled the last known group attacks for that group. If the difference between the recalled and the newly presented group attack locations was large, the new attack points were deemed novel which drove the medial septum of the basal forebrain to discount the old hippocampal memory and instead encode the new attack points. However, if the difference was small, the new attack points were ignored leading to anchoring. In addition, the substantia innominata was used to blend information between the current set of attacks and a recall of past attacks from the hippocampus. When the difference between the predicted attack point and the actual point is high, surprise relayed from the anterior cingulate cortex (ACC) and locus coeruleus (LC) biases the system to use current information over past information.

Figure 8:
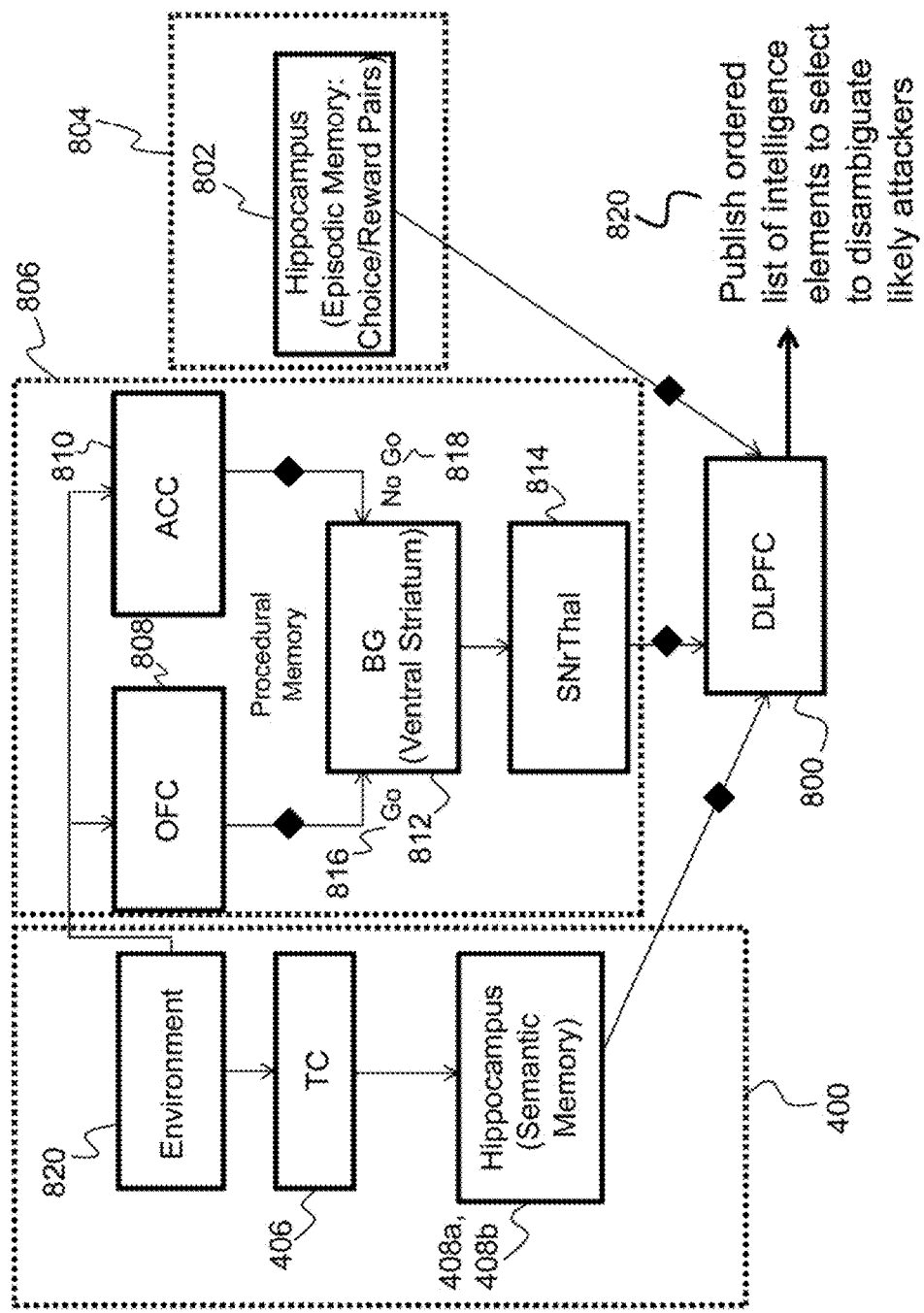
FIG. 8 is an illustration of merging of the memory systems into the dorsolateral prefrontal cortex (DLPFC) to select a winning intelligence (INT) to choose according to the principles of the present invention.

For the INT selection task, the same system as described in Literature Reference No. 50 was used, but with different inputs and outputs. The input was the INT chosen and the output was the utility of the INT over previous trials. As in the work of Ziegler et al. (see Literature Reference No. 50), if the difference between actual and recalled utility of an INT is high, novelty signals from the basal forebrain encode the new utility values, otherwise, new utility values are ignored. This would also cause an anchoring bias in recalling the utility of an INT. Here, utility is proportional to negentropy and inversely proportional to entropy. Utility is provided to the hippocampus through dopaminergic and serotonergic connections which encode reward and cost, respectively (see Literature Reference No. 19). In time, INTs which have led to a recent decrease in entropy would be predicted to reduce entropy on subsequent trials even though this is subject to anchoring. For each trial, the utility of each INT would be recalled. Thus, for seven INTs (intelligence elements), there would be seven utilities recalled. As illustrated in FIG. 8, the seven utilities are projected from the hippocampus 802 in the episodic memory module 804 to the DLPFC 800, an area of PFC known to be involved in executive control of actions (see Literature Reference No. 35). The work of Ziegler et. al. (see Literature Reference No. 50) adapted to the INT selection task allows for the recall of the utility of all INTs for anchoring bias.

(4.4) Procedural Memory

Procedural memory includes inflexible response-based strategies and context-dependent "place"-based strategies. In the present invention, the focus is on the latter. The work of Chelian et al. (see Literature Reference No. 5) developed a model of action selection, depicted as the procedural memory module 806 in FIG. 8, using several cortical regions including the orbitofrontal cortex (OFC) 808, the anterior cingulate cortex (ACC) 810, and the DLPFC 800, with a number of subcortical structures such as the ventral tegmental area (VTA), raphe nucleus (RN), and basal forebrain (BF). In that model, each action had parallel representations in the OFC 808 and the ACC 810. Action representations in the OFC 808 and the ACC 810 compete in the DLPFC 800, via the basal ganglia 812 (see Literature Reference No. 14) and the SNrThal 814, which represents the substantia nigra pars reticulate (SNr) and the associated area of the thalamus (Thal). The DLPEC 800 inputs from the OFC 808 represented the expected reward of an action given an environment via the basal gaglia's 812 direct or Go pathway 816.

Conversely, connections from the ACC 810 to the DLPFC 800, which encoded the expected cost of an action for a context, went through the basal ganglia's 812 indirect or No Go pathway 818. The VTA was used to drive learning according to differences between actual and expected rewards, and the RN was used to drive learning according to differences between actual and expected costs. The BF neurons were used to capture short-term dynamics in decision making, such as exploration after loss and exploitation after gain. As illustrated in their results, by trying different actions, actions that led to higher than expected reward (cost) increased their weights in the direct (indirect) pathway, making them more likely to be picked in subsequent trials. Although their model was applied to a variant of the multi-arm bandit game with betting (see Literature Reference No. 26), it could be applied to other domains by defining: 1) how environments are perceived; 2) the set of possible actions for each environment; 3) the reward for an action; and 4) the cost for an action.

In applying the above model to the INT selection task, how environments are perceived represent the groups to distinguish provided by the temporal cortex. The set of possible actions for each environment is the set of INTs. The reward for an action is the negentropy gained by choosing an INT given the context from the temporal cortex (TC). As a non-limiting example, the cost for an action is the standard deviation of the negentropy gained by choosing an INT accumulated over several trials. This is a measure of uncertainty or risk in payoff. By choosing different INTs in the contexts provided by the TC, INTs which provide a high average negentropy (or low standard deviation of negentropy) would increase (or decrease) their weights in the direct (or indirect) pathway. In time, these INTs would be more likely to be picked over less utile INTs. Also, given an INT with a slightly higher expected value and standard deviation and one with a lower expected value and risk, the present system would choose the latter, leading to risk aversion. For each trial, the most utile and "safe" INT would be selected. Thus, for seven INTs, there would be one INT chosen. This INT would then project to the DLPFC.

(4.5) Integrated Decision Making

Integration of the various modules described above will be described, noting differences in training regime, execution, and content. FIGS. 6A and 6B illustrate learning rates and maturity, respectively, of modeled semantic, episodic and procedural memory systems as a function of time. The bold solid curves 600 represent semantic memory, the unbolded solid curves 602 represent episodic memory, and the dashed curves 604 represent procedural memory. These curves are meant to only qualitatively represent time courses. The dotted vertical lines 606 represent starting the task so semantic memory (bold solid curve 600) reflects training before the task begins, as depicted in FIG. 6A. Importantly, learning rates for episodic memory (unbolded solid curves 602), and procedural memory (dashed curve 604) do not go to zero. However, as shown in FIG. 6B, their maturity may saturate if the statistics of the environment are constant.

Referring to FIG. 6A, semantic memory (bold solid curve 600) reflects hard coded rules learned before the task which do not update. Episodic memory (unbolded solid curves 602), on the other hand, reflects continually updated affective traces of INT's updated after each trial. Finally, procedural memory (dashed curve 604) reflects the learned utility of a choice but its learning proceeds at a slower rate than that of episodic memory (unbolded solid curves 602).

FIG. 6B is the time integral of FIG. 6A. Given what is known about the time scales of these memory types, semantic memory (bold solid curve 600) would dominate early performance because episodic memory (unbolded solid curves 602) and procedural memory (dashed curve 604) have not had an opportunity to mature yet. However, with time, episodic memory (unbolded solid curves 602) would come to bias semantic memory (bold solid curve 600). Finally, procedural memory (dashed curve 604) would come to favor both episodic memory (unbolded solid curves 602) and semantic memory (bold solid curve 600). A prediction of this model is that if training is cut short, only semantic and episodic memory components would be evident. In other words, subjects should only reflect pre-training and anchoring. Similarly, if no training is cut extremely short, only semantic components would be evident. To implement this, one can change learning rates in a neural network simulator.

Figure 7:
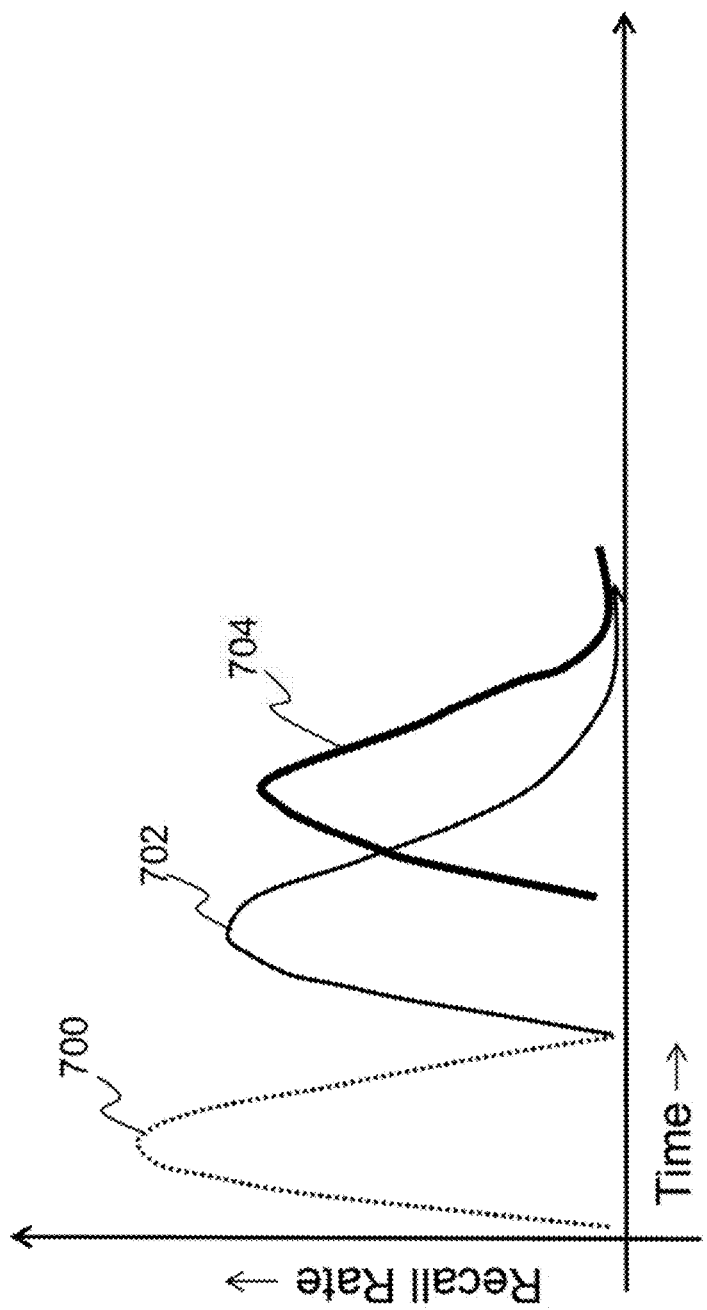
FIG. 7 illustrates recall rates of modeled semantic, episodic, and procedural memory systems as a function of time according to the principles of the present invention.

However these memory systems also execute at different rates. Given a large amount of training, procedural memory would be recalled first, then episodic, then semantic, This is depicted in FIG. 7, where the dashed curve 700 represents procedural memory, the unbolded solid curve 702 represents episodic memory, and the bolded solid curve 804 represents semantic memory. A prediction of this model is that if trial lengths are cut short, procedural memory (dashed curve 700) would dominate, then the semantic memory (bolded solid curve 704) and episodic memory (unbolded solid curve 702), and then all three memory systems. In other words, if trial times are short, only learned utility values would be displayed, then learned utility values with anchoring, and then finally a mix of all three memory systems (procedural, episodic and semantic). To implement this, one can let each module produce results based on their own rates but only blend them at the appropriate time in a neural network simulator.

Referring to FIG. 8, for each trial, semantic memory 400 recalled rules, such as those described above, about which INT to choose (i.e., one of seven INTs) given information from the environment 820. Episodic memory 804 recalled an affective trace of utility across all INTs (i.e., seven utility values for seven INTs). Procedural memory 806 recalled the most utile and sale INT (i.e., one of seven INTs). These three modules converge in the DLPFC 800 using such methods as a convex combination (i.e., a weighted sum of the inputs or a voting paradigm could be used). Thus, the outputs of the semantic memory 800, the episodic memory 800, and the procedural memory 800 are combined in the DLPFC 800. An ordered list of intelligence elements is published to select to disambiguate likely attackers 820 is then generated. The order list is used to execute an operation, such as decision making in various contexts. Examples of operations to be executed include, but are not limited to, medical diagnosis, risk aversion, exploration after loss, and exploitation after gain.

As can be understood by someone skilled in the art, the invention described herein can be applied to other domains. To do so, the following need to be defined:
1. What do the distribution of values represent?
2. What do the rules represent?
   a. What are the possible outcomes of rule application?
   b. How do the different outcomes affect the probability distribution?

This defines a very general domain of applicability. The present invention takes in a probability distribution, or a set of values, divides them into a set of equivalent classes indicating which are the most relevant features of the distribution to consider, and then selects some query, test or action to apply to refine the set of values, with the aim of trying to drive the set of values to a particular state. In the case of a probability distribution, this might mean a very peaky distribution indicating the most likely culprit. In the case of some set of values, this might mean driving the set of values towards some nominal set of values.

A non-limiting example is medical diagnosis. In this domain, the values are probabilities over different diseases. The rules represent different diagnostic tests or symptoms. Depending on the outcome of the various tests, the probabilities of the various diseases are adjusted. The probabilities can be initialized to the various priors for the diseases. The goal is to adjust the probability distribution to a low entropy state to find the most likely cause.

Another, different mapping onto the present invention is where, instead of the information going into the temporal cortex (TC) module being probabilities, they are levels of various symptoms. For instance, one value can represent temperature, one blood pressure, and one blood pH. Then, the TC divides these sets of symptoms into different equivalent classes towards which sets of symptoms would be best to treat or mitigate. Given this information, the TC module would select a treatment. This treatment may then change the symptoms (e.g., lower the blood pressure, but raise the temperature). This process could iterate until the set of symptoms reaches a nominal state where no treatments are indicated. For episodic and procedural memory, a utility function like the difference between current temperature and 98.7 Fahrenheit would be used for reward, while time and money could be used for cost. When a treatment brings down (increases) a high (low) temperature, that's a reward that the hippocampal anchoring system would tag that treatment with. The basal ganglia system would learn the expected mean and standard deviation of the utility of that treatment in the Go and No Go pathways, respectively. Thus, the system described herein can be used for decision making in a variety of contexts.

An example of a computer system 900 in accordance with one aspect is shown in FIG. 9. The computer system 900 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 900. When executed, the instructions cause the computer system 900 to perform specific actions and exhibit specific behavior, such as described herein.

The computer system 900 may include an address/data bus 902 that is configured to communicate information. Additionally, one or more data processing units, such as a processor 904, are coupled with the address/data bus 902. The processor 904 is configured to process information and instructions. In one aspect, the processor 904 is a microprocessor. Alternatively, the processor 904 may be a different type of processor such as a parallel processor, or a field programmable gate array.

The computer system 900 is configured to utilize one or more data storage units. The computer system 900 may include a volatile memory unit 906 (e.g., random access memory ("RAM"), static RAM, dynamic RAM, etc.) coupled with the address/data bus 902, wherein a volatile memory unit 906 is configured to store information and instructions for the processor 904. The computer system 900 further may include a non-volatile memory unit 908 (e.g., read-only memory ("ROM"), programmable ROM ("PROM"), erasable programmable ROM ("EPROM"), electrically erasable programmable ROM "EEPROM"), flash memory, etc.) coupled with the address/data bus 902, wherein the non-volatile memory unit 908 is configured to store static information and instructions for the processor 904. Alternatively, the computer system 900 may execute instructions retrieved from an online data storage unit such as in "Cloud" computing. In an embodiment, the computer system 900 also may include one or more interfaces, such as an interface 99, coupled with the address/data bus 902. The one or more interfaces are configured to enable the computer system 900 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 900 may include an input device 912 coupled with the address/data bus 902, wherein the input device 912 is configured to communicate information and command selections to the processor 900. In accordance with one aspect, the input device 912 is an alphanumeric input device, such as a keyboard, that may include alphanumeric and/or function keys. Alternatively, the input device 912 may be an input device other than an alphanumeric input device. In one aspect, the computer system 900 may include a cursor control device 914 coupled with the address/data bus 902, wherein the cursor control device 914 is configured to communicate user input information and/or command selections to the processor 900. In one aspect, the cursor control device 914 is implemented using a device such as a mouse, a track-ball, a track-pad, an optical tracking device, or a touch screen. The foregoing notwithstanding, in one aspect, the cursor control device 914 is directed and/or activated via input from the input device 912, such as in response to the use of special keys and key sequence commands associated with the input device 912. In an alternative aspect, the cursor control device 914 is configured to be directed or guided by voice commands.

In one aspect, the computer system 900 further may include one or more optional computer usable data storage devices, such as a storage device 916, coupled with the address/data bus 902. The storage device 916 is configured to store information and/or computer executable instructions. In one aspect, the storage device 916 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 918 is coupled with the address/data bus 902, wherein the display device 918 is configured to display video and/or graphics. In one aspect, the display device 918 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 900 presented herein is an example computing environment in accordance with one aspect. However, the non-limiting example of the computer system 900 is not strictly limited to being a computer system. For example, one aspect provides that the computer system 900 represents a type of data processing analysis that may he used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 10:
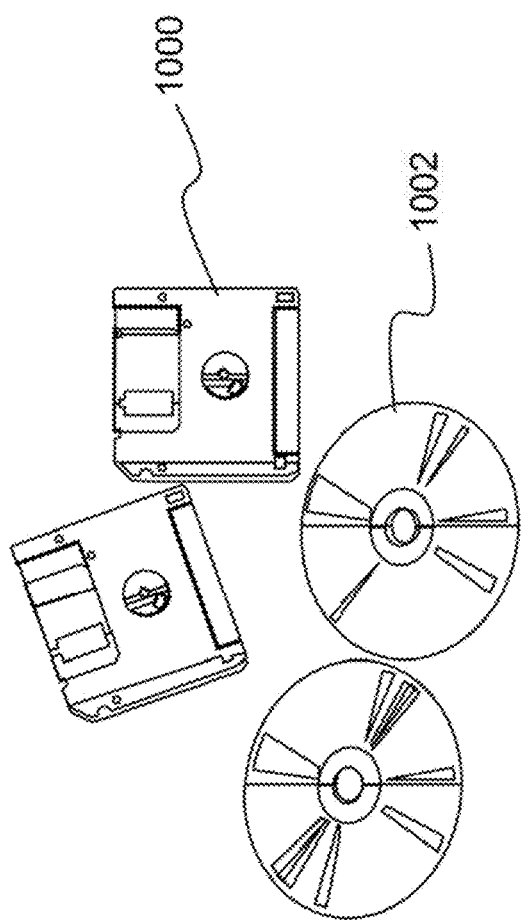
FIG. 10 is an illustration of a computer program product according to the principles of the present invention.

An illustrative diagram of a computer program product embodying an aspect of the present invention is depicted in FIG. 10. As a non-limiting example, the computer program product is depicted as either a floppy disk 1000 or an optical disk 1002. However, as mentioned previously, the computer program product generally represents computer readable code (i.e., instruction means or instructions) stored on any compatible non-transitory computer readable medium.

What is claimed is:

1. A system for selecting among intelligence elements of a neural model, the system comprising:
   one or more processors and a non-transitory memory having instructions encoded thereon such that when the instructions are executed, the one or more processors perform operations of:
   receiving a set of intelligence elements which change group attack probability estimates to disambiguate likely attackers;
   selecting an intelligence element in the set of intelligence elements;
   for each selected intelligence element, performing a plurality of operations comprising:

(a) training a semantic memory component of the neural model to learn a set of group probability distributions for a plurality of groups and a set of rules related to the plurality of groups based on the set of group probability distributions,
wherein the set of rules are utilized to determine which intelligence element in the set of intelligence elements related to the plurality of groups to select;

(b) given an environment comprising a new set of probability distributions for a plurality of groups, using the semantic memory component to recall which rule in the set of rules to select to receive a particular intelligence element, wherein the selected rule is an output of the semantic memory component;

(c) using an episodic memory component in the neural model to recall a utility value for each information element, wherein the utility values are an output of the episodic memory component; and (d) using a procedural memory component to recall and select the information element considered to have the highest utility, wherein the selected information element is an output of the procedural memory component;

repeating operations (a) through (d) until each of the intelligence elements has been selected; and publishing an ordered list of intelligence elements to select to disambiguate likely attackers.

2. The system as set forth in claim 1, wherein the one or more processors further perform operations of:
encoding which groups in the plurality of groups need to be distinguished based on the set of group probability distributions;
recalling which intelligence element is best to discriminate between the groups;
requesting an intelligence element selection;
selecting a rule corresponding to the requested intelligence element selection to apply to at least one probability distribution in the set of group probability distributions; and
updating the set of group probability distributions.

3. The system as set forth in claim 2, wherein the plurality of groups are distinguished by different entropy states, and the selected rule is the rule in the set of rules that will most likely represent a lower entropy state.

4. The system as set forth in claim 3, wherein utility is proportional to negentropy and inversely proportional to entropy.

5. The system as set forth in claim 4, wherein the set of group probability distributions represent probabilities over different diseases, the set of rules represent different diagnostic tests, and wherein the set of group probability distributions are updated based on outcomes of the different diagnostic tests, wherein the goal is to adjust the set of group probability distributions to a low entropy state to make a decision regarding a particular disease.

6. The system as set forth in claim 1, wherein the set of group probability distributions represent probabilities over different diseases, the set of rules represent different diagnostic tests, and wherein the set of group probability distributions are updated based on outcomes of the different diagnostic tests, wherein the goal is to adjust the set of group probability distributions to a low entropy state to make a decision regarding a particular disease.

7. A computer-implemented method for selecting among intelligence elements of a neural model comprising:
an act of causing one or more processors to execute instructions stored on a non-transitory memory such that upon execution, the one or more processors perform operations of:
receiving a set of intelligence elements which change group attack probability estimates to disambiguate likely attackers;
selecting an intelligence element in the set of intelligence elements;
for each selected intelligence element, performing a plurality of operations comprising:

(a) training a semantic memory component of the neural model to learn a set of group probability distributions for a plurality of groups and a set of rules related to the plurality of groups based on the set of group probability distributions,
wherein the set of rules are utilized to determine which intelligence element in the set of intelligence elements related to the plurality of groups to select;

(b) given an environment comprising a new set of probability distributions for a plurality of groups, using the semantic memory component to recall which rule in the set of rules to select to receive a particular intelligence element, wherein the selected rule is an output of the semantic memory component;

(c) using an episodic memory component in the neural model to recall a utility value for each information element, wherein the utility values are an output of the episodic memory component; and (d) using a procedural memory component to recall and select the information element considered to have the highest utility, wherein the selected information element is an output of the procedural memory component;

repeating operations (a) through (d) until each of the intelligence elements has been selected; and publishing an ordered list of intelligence elements to select to disambiguate likely attackers.

8. The method as set forth in claim 7, wherein the one or more processors perform operations of:
encoding which groups in the plurality of groups need to be distinguished based on the set of group probability distributions;
recalling which intelligence element is best to discriminate between the groups;
requesting; an intelligence element selection;
selecting a rule corresponding to the requested intelligence element selection to apply to at least one probability distribution in the set of group probability distributions; and
updating the set of group probability distributions.

9. The method as set forth in claim 8, wherein the plurality of groups are distinguished by different entropy states, and the selected rule is the rule in the set of rules that will most likely represent a lower entropy state.

10. The method as set forth in claim 9, wherein utility is proportional to negentropy and inversely proportional to entropy.

11. The method as set forth in claim 10, wherein the set of group probability distributions represent probabilities over different diseases, the set of rules represent different diagnostic tests, and wherein the set of group probability distributions are updated based on outcomes of the different diagnostic tests, wherein the goal is to adjust the set of group probability distributions to a low entropy state to make a decision regarding a particular disease.

12. The method as set forth in claim 7, wherein the set of group probability distributions represent probabilities over different diseases, the set of rules represent different diagnostic tests, and wherein the set of group probability distributions are updated based on outcomes of the different diagnostic tests, wherein the goal is to adjust the set Of group probability distributions to a low entropy state to make a decision regarding a particular disease.

13. A computer program product for selecting among intelligence elements of a neural model, the computer program product comprising:

computer-readable instructions stored on a non-transitory computer-readable medium that are executable by a computer having one or more processor for causing the processor to perform operations of:

receiving a set of intelligence elements which change group attack probability estimates to disambiguate likely attackers;

selecting an intelligence element in the set of intelligence elements;

for each selected intelligence element, performing a plurality of operations comprising:

(a) training a semantic memory component of the neural model to learn a set of group probability distributions for a plurality of groups and a set of rules related to the plurality of groups based on the set of group probability distributions, wherein the set of rules are utilized to determine which intelligence element in the set of intelligence elements related to the plurality of groups to select;

(b) given an environment comprising a new set of probability distributions for a plurality of groups, using the semantic memory component to recall which rule in the set of rules to select to receive a particular intelligence clement, wherein the selected rule is an output of the semantic memory component;

(c) using an episodic memory component in the neural model to recall a utility value for each information element, wherein the utility values are an output of the episodic memory component; and (d) using a procedural memory component to recall and select the information element considered to have the highest utility, wherein the selected information element is an output of the procedural memory component;

repeating operations (a) through (d) until each of the intelligence elements has been selected; and publishing an ordered list of intelligence elements to select to disambiguate likely attackers.

14. The computer program product as set forth in claim 13, further comprising instructions for causing the one or more processors to perform operations of:

encoding which groups in the plurality of groups need to be distinguished based on the set of group probability distributions;

recalling which intelligence element is best to discriminate between the groups;

requesting an intelligence element selection;

selecting a rule corresponding to the requested intelligence element selection to apply to at least one probability distribution in the set of group probability distributions; and updating the set of group probability distributions.

15. The computer program product as set forth in claim 14, wherein the plurality of groups are distinguished by different entropy states, and the selected rule is the rule in the set of rules that will most likely represent a lower entropy state.

16. The computer program product as set forth in claim 15, wherein utility proportional to negentropy and inversely proportional to entropy.

17. The computer program product as set forth in claim 16, wherein the set of group probability distributions are probabilities over different diseases, the set of rules represent different diagnostic tests, and wherein the set of group probability distributions are updated based on outcomes of the different diagnostic tests, wherein the goal is to adjust the set of group probability distributions to a low entropy state to make a decision regarding a particular disease.

18. The computer program product as set forth in claim 13, wherein the set of group probability distributions are probabilities over different diseases, the set of rules represent different diagnostic tests, and wherein the set of group probability distributions are updated based on outcomes of the different diagnostic tests, wherein the goal is to adjust the set of group probability distributions to a low entropy state to make a decision regarding a particular disease.

* * * * *